(12) United States Patent
McCrary

(10) Patent No.: US 7,335,125 B2
(45) Date of Patent: Feb. 26, 2008

(54) CONTINUOUSLY VARIABLE TRANSMISSION

(75) Inventor: Paul T. McCrary, Belleville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 154 days.

(21) Appl. No.: 11/203,706

(22) Filed: Aug. 15, 2005

(65) Prior Publication Data

US 2007/0037651 A1    Feb. 15, 2007

(51) Int. Cl.
*F16H 47/04*    (2006.01)
(52) U.S. Cl. .......................................... 475/72
(58) Field of Classification Search .................. 475/80, 475/72
See application file for complete search history.

(56) References Cited

U.S. PATENT DOCUMENTS

| | | | |
|---|---|---|---|
| 3,969,958 A * | 7/1976 | Miyao et al. ................. | 475/82 |
| 3,988,949 A | 11/1976 | Weseloh et al. | |
| 4,313,351 A * | 2/1982 | Hagin .......................... | 475/80 |
| 4,641,552 A | 2/1987 | Kurywczak | |
| 4,843,907 A * | 7/1989 | Hagin et al. .................. | 475/80 |
| 5,269,732 A | 12/1993 | Weiss et al. | |
| 5,496,223 A * | 3/1996 | Jarchow ....................... | 475/72 |
| 5,584,772 A * | 12/1996 | Hayd ........................... | 475/72 |
| 5,766,107 A * | 6/1998 | Englisch ...................... | 475/80 |
| 5,893,814 A | 4/1999 | Kiyosawa | |
| 5,916,053 A | 6/1999 | McCarrick et al. | |
| 5,919,111 A | 7/1999 | Park | |
| 5,931,760 A | 8/1999 | Beim et al. | |
| 5,947,858 A | 9/1999 | Williams | |
| 5,993,347 A | 11/1999 | Park | |

FOREIGN PATENT DOCUMENTS

DE    29 02 893 A1    7/1980

* cited by examiner

*Primary Examiner*—Dirk Wright
(74) *Attorney, Agent, or Firm*—Warn Patners, P.C.

(57) ABSTRACT

The present invention has a dual sun planetary gearset, as well as a dog clutch or other type of shifting device, which allows for the hydrostatic unit to operate in a reverse direction in similar fashion to how it operates in a forward direction, thereby increasing efficiency and torque in the reverse direction. The gearset of the present invention has a first sun gear having one or more planetary gears that are mounted on a carrier, and a second sun gear, also having one or more planetary gears that are mounted on the same common carrier as the first set of planetary gears.

33 Claims, 2 Drawing Sheets

CONTINUOUSLY VARIABLE TRANSMISSION

FIELD OF THE INVENTION

The present invention relates to the field of planetary gearsets and their use in continuously variable transmissions.

BACKGROUND OF THE INVENTION

Hydrostatic units are a common way of achieving a stepless transmission for use in an automobile. Stepless transmissions are desirable because they are steplessly adjustable over a wide range, and can provide improved efficiency in packaging and fuel economy. A common way to achieve stepless gearing is through the use of a hydrostatic unit. Hydrostatic units consist of a pump, with a variable displacement volume, and a motor, which is driven by the pump, having either a fixed or variable displacement volume. A power source coupled to the transmission provides power to a planetary gearset, which in turn splits the power between the hydrostatic unit and the output.

One problem that exists in current continuously variable transmissions that utilize hydrostatic units is that there is no "mechanical neutral," meaning that when a neutral condition is desired, there is no complete disconnect from the power source to the transmission. In most current designs, neutral is achieved by adjusting the swashplate of the pump in the hydrostatic unit such that no power is transferred to the motor. One major drawback to this design is that residual drag torque in the transmission can still transfer a small amount of torque to the output, thereby not allowing for a true neutral position; also, any deviation in the tolerance of the displacement volumes in the hydrostatic unit may also cause a small amount of torque to be transferred through the transmission, which would also negate the vehicle being in neutral.

Another problem with current designs using a hydrostatic unit involves trying to achieve a reverse gear. This is accomplished by reversing the operation of the hydrostatic unit. In the reverse configuration, the motor acts as the pump, and the pump acts as the motor. The drawback in this method of achieving reverse comes from the displacement volumes of the pump and motor in the hydrostatic unit being configured to provide the proper amount of torque when the vehicle is going in a forward direction. In reverse, a very small amount of torque is transferred through the hydrostatic unit to drive the gearset, resulting in the vehicle moving very slow, and with little power. Also, when in reverse, because of the displacement volumes in the hydrostatic unit, the engine may run at very high rpm to achieve reverse using this method, making it very inefficient.

SUMMARY OF THE INVENTION

The present invention is directed toward overcoming these and other problems associated with using a hydrostatic unit in a continuously variable transmission. The present invention allows for a "mechanical neutral," as well as a more efficient reverse configuration to be achieved. The present invention has a dual sun planetary gearset, as well as a dog clutch or other type of shifting device, which allows for the hydrostatic unit to operate in a reverse direction in similar fashion to how it operates in a forward direction, thereby increasing efficiency and torque in the reverse direction. The gearset of the present invention has a first sun gear having one or more planetary gears that are mounted on a carrier. These planetary gears are connected to a second set of planetary gears, also mounted on a carrier, and driving a second sun gear. The second sun gear is connected to another gear, which is in mesh with a gear connected to the pump. The second sun drives the pump of the hydrostatic unit, which is turn drives the motor. The motor is connected to the carrier through a gearmesh. The carrier and output are combined to transmission output in forward. The dual sun planetary gearset provides two powerflow paths through the transmission, the first as described for forward direction. The second, for reverse direction, drives the motor (as a pump) and outputs the pump (as a motor) to drive the second sun gear and transmission output. When the shifting device is moved to either the forward or reverse position, the hydrostatic unit increases the speed of the vehicle without increasing the speed of the input, providing a stepless power transfer through the transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
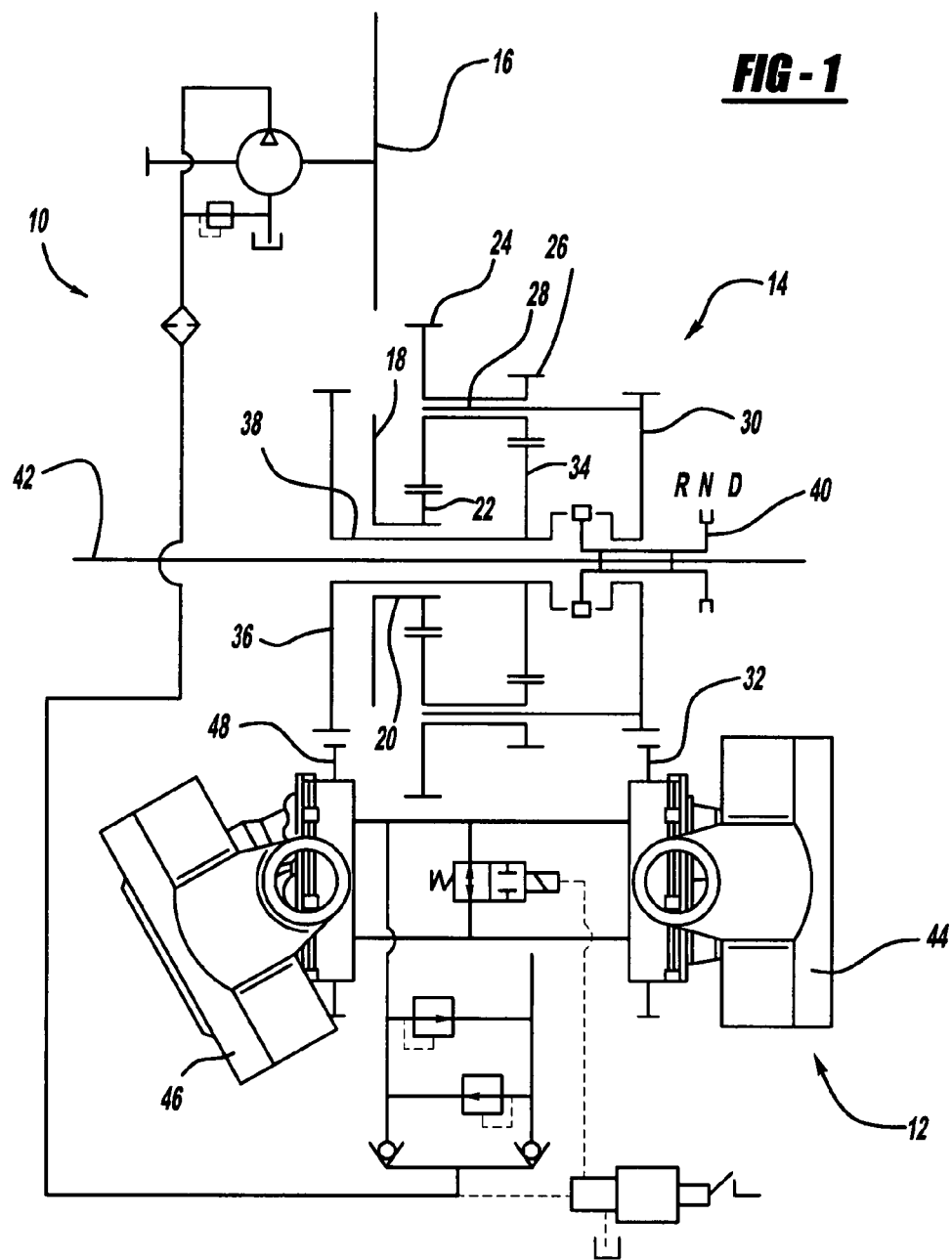
FIG. 1 is a schematic of a continuously variable transmission having a hydrostatic unit and a dual sun planetary gearset, according to the present invention.
Figure 2:
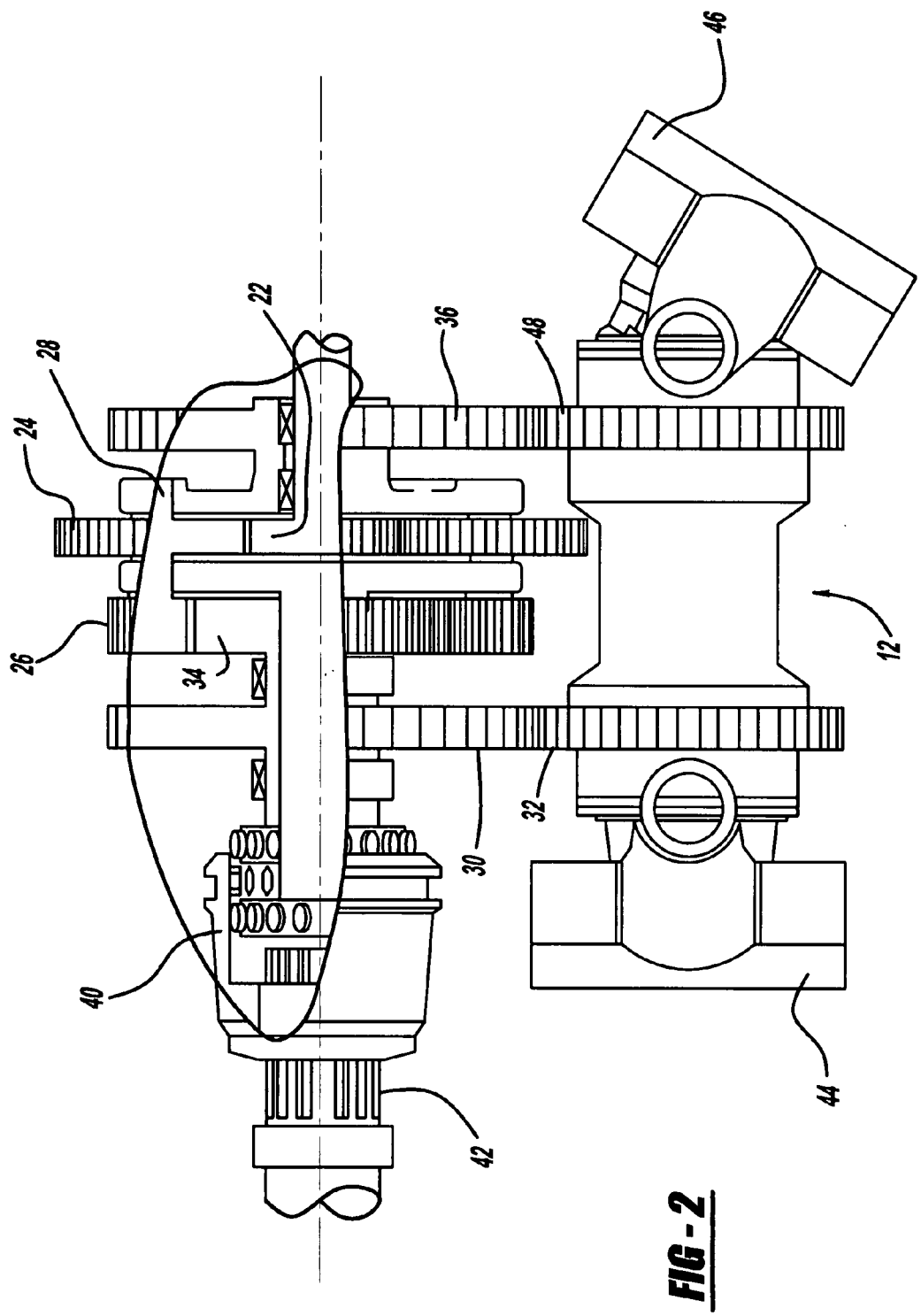
FIG. 2 is a cross section of a continuously variable transmission having a hydrostatic unit according to the present invention.

A schematic diagram of the present invention is shown FIG. 1 generally at 10. The present invention has a hydrostatic unit 12 working in conjunction with dual sun planetary gearset 14. The planetary gearset 14 receives input from an engine or source of power 16 which drives an input gear 18. The input gear 18 is mounted on a first shaft 20 with a first sun gear 22. The sun gear 22 is in mesh with a first set of planetary gears 24. The first set of planetary gears 24 and a second set of planetary gears 26 are mounted on a carrier 28. The carrier 28 is connected to a gear, or first forward gear 30, which drives a second forward or pump gear 32 of the hydrostatic unit 12. The second set of planetary gears 26 are in mesh with a second sun gear 34. The second sun gear 34 and an output gear 36 are mounted on a second shaft 38. Both the second sun gear 34, and the carrier 28 (as shown through first forward gear 30) are connected to a shift mechanism, such as a dog clutch 40, that is slidably mounted on an output shaft 42. The dog clutch 40 can connect to either the carrier 28 through the first forward gear 30 or the second sun gear 34 separately, but not at the same time. The dog clutch 40 can also be positioned such that it does not engage the carrier 28 or the second sun gear 34, thereby disconnecting the dual sun planetary gearset 14 completely from the output shaft 42, and creating a neutral position, or mechanical neutral.

The hydrostatic unit 12 is of the type that is well known in the art and commonly used. The hydrostatic unit 12 has a pump 44 which hydraulically drives a motor 46, the motor 46 is connected to a motor gear 48 which is in mesh with the output gear 36. The pump 44 circulates fluid back and forth between the pump 44 and motor 46, driving the motor 46 to rotate. The stepless gearing is achieved through the use of the motor 46 in the hydrostatic unit 12. As the angle of the swashplate inside the motor 46 changes relative to motor gear 48, the amount of torque and power transferred through the hydrostatic unit 12 changes as well. Changing this angle also effects the final drive ratio of the planetary gearset 14. When the swashplate in the hydrostatic unit 12 is at a maximum angle relative to the motor gear 48, the result is the planetary gearset 14 will behave in similar fashion to first gear in a typical automatic or manual transmission. As the swashplate in the motor 46 moves toward a parallel position relative to the motor gear 48, less torque is generated, and the planetary gearset 14 will have the effect on the final output of a drive or overdrive gear in a common automatic or manual transmission.

The power flow path for the various positions of the dog clutch 40 will now be described. When the dog clutch 40 is slid in a first direction, or positioned so that it is connected to the first forward gear 30 and thereby connected to the carrier 28, the planetary gearset 14 will provide rotational power to the output shaft 42 such that the output shaft 42 propels the vehicle forward. The first sun gear 22 drives the first set of planetary gears 24, which in turn rotate carrier 28. The carrier 28 is connected to the first forward gear 30, and the first forward gear 30 drives the pump gear 32, and is also engaged with the dog clutch 40, which drives the output shaft 42. The hydrostatic unit 12 provides power delivered back into the planetary gearset 14 and also provides the stepless ratio change by motor gear 48 meshing with the output gear 36. The output gear 36 is operably connected to second sun gear 34, which is in mesh with the second set of planetary gears 26. The second set of planetary gears 26 are mounted on carrier 28, which as previously stated, drives first forward gear 30. The end result is that the power transmitted to the first forward gear 30 from the engine 16 being split between the planetary gearset 14 and the hydrostatic unit 12, and the hydrostatic unit 12 providing power input back into the planetary gearset 14, as well as providing a stepless ratio change comparable to that of common five and six speed transmissions.

Reverse is achieved by sliding the dog clutch 40 in a second direction or into a position such that it is connected to the second sun gear 34. Power from the engine 16 is still split between the planetary gearset 14 and the hydrostatic unit 12. However, the power is transferred from the first sun gear 22, to the first set of planetary gears 36 and the second set of planetary gears 26. The second sun gear 34 is in mesh with the second set of planetary gears 26 and passes the power flow onto the dog clutch 40, and finally, to output shaft 64. Because of the dog clutch 40 engaging the second sun gear 34, instead of the first forward gear 30, the planetary gearset 14 drives the output shaft 64 in a reverse direction, but allows for the hydrostatic unit 12 to still act in the same manner as if the vehicle was going in a forward direction. This provides the necessary amount of torque required to move the vehicle in reverse, and acts similarly to a reverse gear in typical automatic and manual transmissions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A planetary gearset for a continuously variable transmission, comprising:
    a first sun gear coupled to a source of power, having a first set of planetary gears;
    a second sun gear having a second set of planetary gears;
    a common carrier supporting said first set of planetary gears, said second set of planetary gears, and a first forward gear;
    a hydrostatic unit having a second forward gear and an output gear, said second forward gear driven by said first forward gear, and said hydrostatic unit provides reaction torque to said planetary gearset; and
    a shift mechanism for configuring said planetary gearset for operating in a forward direction, a reverse direction, and for creating a mechanical neutral.

2. The planetary gearset for a continuously variable transmission of claim 1, when said shift mechanism is configured in said forward direction, power is transferred through said first sun gear, said first set of planetary gears in mesh with said first sun gear, said common carrier, said first forward gear, and through an output shaft.

3. The planetary gearset for a continuously variable transmission of claim 1, when said shift mechanism is configured in said reverse direction, power is transferred through said first sun gear, said first set of planetary gears in mesh with said first sun gear, said common carrier, said second set of planetary gears in mesh with said second sun gear, said second sun gear, said shift mechanism, and through an output shaft.

4. The planetary gearset for a continuously variable transmission of claim 1, when said shift mechanism is not configured in either said forward direction or said reverse direction, said source of power is disconnected from said first sun gear, thereby creating said mechanical neutral.

5. The planetary gearset for a continuously variable transmission of claim 1, wherein power is divided between said hydrostatic unit and said planetary gearset.

6. The planetary gearset for a continuously variable transmission of claim 1, wherein said hydrostatic unit provides the effect of a stepless gear ratio change.

7. The planetary gearset for a continuously variable transmission of claim 1, wherein said hydrostatic unit operates in the same manner when said planetary gearset is operating in said forward direction, or in said reverse direction.

8. The planetary gearset for a continuously variable transmission of claim 1, wherein said hydrostatic unit transfers rotational force to said output gear when said shift mechanism is engaged with said first forward gear or said second sun gear, thereby assisting said planetary gearset output.

9. A continuously variable transmission having a dual sun planetary gearset, comprising:
    a first sun gear, in mesh with a first set of planetary gears, and mounted on a first shaft;
    a second sun gear, in mesh with a second set of planetary gears, and mounted on a second shaft;
    a carrier, upon which said first planetary gearset and said second planetary gearset are mounted and free to rotate thereon;
    a forward gear, connected to, and driven by said carrier;

a hydrostatic unit, driven by said forward gear;
an output gear, driven by said hydrostatic unit, and mounted on said second shaft for rotation with said second sun gear; and
a shift mechanism for configuring said compound planetary gearset for operating in a forward direction, or in a reverse direction, said shift mechanism slidably mounted on an output shaft.

10. The compound planetary gearset for use in a continuously variable transmission of claim 9, said hydrostatic unit further comprising:
a pump, driven by said forward gear, which circulates fluid through said hydrostatic unit; and
a motor, which is powered by said pump, and drives said output gear, assisting in power output of said planetary gearset.

11. The compound planetary gearset for use in a continuously variable transmission of claim 9, when said shift mechanism is slid in a first direction, said planetary gearset is configured to produce forward propulsion.

12. The compound planetary gearset for use in a continuously variable transmission of claim 9, when said shift mechanism is slid is a second direction, said planetary gearset is configured to produce reverse propulsion.

13. The compound planetary gearset for use in a continuously variable transmission of claim 9, wherein said forward direction is achieved by transferring power and torque through said first sun gear, said first set of planetary gears, through said carrier, through said forward gear, through said shift mechanism, and through said output shaft.

14. The compound planetary gearset for use in a continuously variable transmission of claim 9, wherein said reverse direction is achieved by transferring power and torque through said first sun gear, said first set of planetary gears, said carrier, through said second set of planetary gears, said second sun gear, through said shift mechanism, and to said output shaft.

15. The compound planetary gearset for use in a continuously variable transmission of claim 9, wherein said shift mechanism is moved into a position where said output shaft is disconnected from said planetary gearset and said hydrostatic unit, transferring no power to said output shaft, providing for a mechanical neutral.

16. A method for achieving stepless gearing in a continuously variable transmission, method comprising the steps of:
providing a compound planetary gearset, comprising the steps of:
providing a first sun gear;
providing a second sun gear;
providing a carrier having a first set of planetary gears in mesh with said first sun gear, and a second set of planetary gears in mesh with said second sun gear:
providing a forward gear connected to and driven by said carrier;
providing an output gear, mounted on a shaft, with said second sun gear being mounted on said shaft;
providing a shift mechanism slidably mounted on an output shaft, capable of being engaged with said drive gear, or capable of being engaged with said shaft; and
providing a hydrostatic unit working in conjunction with said compound planetary gearset.

17. The method of achieving stepless gearing in a continuously variable transmission of claim 16, further comprising the steps of providing said hydrostatic unit to be comprised of:
providing a pump, having a gear in mesh with said first forward gear of said planetary gearset, and being driven by said first forward gear; and
providing a motor, having a gear in mesh with said output gear, wherein said motor drives said output gear.

18. The method of achieving stepless gearing in a continuously variable transmission of claim 16, further comprising the steps of providing for a mechanical neutral position by disconnecting said shift mechanism from said drive gear, and disconnecting said shift mechanism from said shaft, thereby delivering no power to said output shaft.

19. The method of achieving stepless gearing in a continuously variable transmission of claim 16, further comprising the steps of providing for assistance of said planetary gearset power output by said hydrostatic unit.

20. The method of achieving stepless gearing in a continuously variable transmission of claim 16, further comprising the steps of operating said hydrostatic unit in the same manner when said shift mechanism is engaged with said drive gear, or said shaft.

21. A planetary gearset for a continually variable transmission, comprising:
a first sun gear coupled to a source of power, having a first set of planetary gears;
a second sun gear having a second set of planetary gears;
a common carrier supporting said first set of planetary gears, said second set of planetary gears, and a first forward gear;
a hydrostatic unit having a second forward gear and an output gear, said second forward gear driven by said first forward gear, and said hydrostatic unit provides reaction torque to said planetary gearset; and
a shift mechanism for configuring said planetary gearset for operating in a forward direction, a reverse direction, and for creating a mechanical neutral, and when said shift mechanism is not configured in either said forward direction or said reverse direction, said source of power is disconnected from said first sun gear, thereby creating said mechanical neutral.

22. The planetary gearset for a continuously variable transmission of claim 21, when said shift mechanism is configured in said forward direction, power is transferred through said first sun gear, said first set of planetary gears in mesh with said first sun gear, said common carrier, said first forward gear, and through an output shaft.

23. The planetary gearset for a continuously variable transmission of claim 21, when said shift mechanism is configured in said reverse direction, power is transferred through said first sun gear, said first set of planetary gears in mesh with said first sun gear, said common carrier, said second set of planetary gear in mesh with said second sun gear, said second sun gear, said shift mechanism, and through an output shaft.

24. The planetary gearset for a continuously variable transmission of claim 21, wherein power is divided between said hydrostatic unit and said planetary gearset.

25. The planetary gearset for a continuously variable transmission of claim 21, wherein said hydrostatic unit provides the effect of a stepless gear ratio change.

26. The planetary gearset for a continuously variable transmission of claim 21, wherein said hydrostatic unit operates in the same manner when said planetary gearset is operating in said forward direction, or in said reverse direction.

27. The planetary gearset for a continuously variable transmission of claim 21, wherein said hydrostatic unit transfers rotational force to said output gear when said shift mechanism is engaged with said first forward gear or said second sun gear, thereby assisting said planetary gearset output.

28. A continuously variable transmission having a dual sun planetary gearset, comprising:
- a first sun gear, in mesh with a first set of planetary gears, and mounted on a first shaft;
- a second sun gear, in mesh with a second set of planetary gears, and mounted on a second shaft;
- a carrier, upon which said first planetary, gearset and said second planetary gearset are mounted and free to rotate thereon;
- a forward gear, connected to, and driven by said carrier;
- a hydrostatic unit, driven by said forward gear;
- an output gear, driven by said hydrostatic unit, and mounted on said second shaft for rotation with said second sun gear; and
- a shift mechanism for configuring said compound planetary gearset for operating in a forward direction, or in a reverse direction, said shift mechanism slidably mounted on an output shaft, and said forward direction is achieved by transferring power and torque through said first sun gear, said first set of planetary gears, through said carrier, through said forward gear, through said shift mechanism, and through said output shaft.

29. The compound planetary gearset for use in a-continuously variable transmission of claim 28, said hydrostatic unit further comprising:
- a pump, driven by said forward gear, which circulates fluid through said hydrostatic unit; and
- a motor, which is powered by said pump, and drives said output gear, assisting in power output of said planetary gearset.

30. The compound planetary gearset for use in a continuously variable transmission of claim 28, when said shift mechanism is slid in a first direction, said planetary gearset is configured to produce forward propulsion.

31. The compound planetary gearset for use in a continuously variable transmission of claim 28, when said shift mechanism is slid is a second direction, said planetary gearset is configured to produce reverse propulsion.

32. The compound planetary gearset for use in a-continuously variable transmission of claim 28, wherein said reverse direction is achieved by transferring power and torque through said first sun gear, said first set of planetary gears, said carrier, through said second set of planetary gears, said second sun gear, through said shift mechanism, and to said output shaft.

33. The compound planetary gearset for use in a continuously variable transmission of claim 28, wherein said shift mechanism is moved into a position where said output shaft is disconnected from said planetary gearset and said hydrostatic unit, transferring no power to said output shaft, providing for a mechanical neutral.

* * * * *